(12) United States Patent
Wikström et al.

(10) Patent No.: US 11,121,821 B2
(45) Date of Patent: Sep. 14, 2021

(54) ENHANCEMENTS FOR RETRANSMISSION DUE TO CONFLICTING TRANSMISSIONS FOR DIFFERENT SERVICES

(71) Applicant: TELEFONAKTIEBOLAGET LM ERICSSON (PUBL), Stockholm (SE)

(72) Inventors: Gustav Wikström, Täby (SE); Niklas Andgart, Södra Sandby (SE); Jonas Fröberg Olsson, Ljungsbro (SE); Daniel Larsson, Lund (SE); Caner Kilinc, Luleå (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 66 days.

(21) Appl. No.: 16/483,612

(22) PCT Filed: Dec. 28, 2017

(86) PCT No.: PCT/SE2017/051356
§ 371 (c)(1),
(2) Date: Aug. 5, 2019

(87) PCT Pub. No.: WO2018/143857
PCT Pub. Date: Aug. 9, 2018

(65) Prior Publication Data
US 2020/0099474 A1    Mar. 26, 2020

Related U.S. Application Data

(60) Provisional application No. 62/455,104, filed on Feb. 6, 2017.

(51) Int. Cl.
*H04L 1/18* (2006.01)
*H04L 1/00* (2006.01)
(Continued)

(52) U.S. Cl.
CPC .......... *H04L 1/1812* (2013.01); *H04L 1/0057* (2013.01); *H04L 1/0068* (2013.01);
(Continued)

(58) Field of Classification Search
CPC ... H04L 1/1812; H04L 1/0057; H04L 1/0068; H04L 1/1835; H04L 1/1864; H04L 1/1896; H04L 5/0007; H04W 72/042
See application file for complete search history.

(56) References Cited

U.S. PATENT DOCUMENTS

2010/0135221 A1    6/2010    Komura
2011/0194518 A1    8/2011    Wu
(Continued)

FOREIGN PATENT DOCUMENTS

EP    1496638 A2    1/2005

OTHER PUBLICATIONS

3GPP; "3rd Generation Partnership Project; Technical Specification Group Radio Access Network; Study on New Radio (NR) Access Technology Physical Layer Aspects" (Release 14), 3GPP TR 38.802 V1.0.0 (Nov. 2016) Technical Specification; Nov. 2016, pp. 1-64.
(Continued)

*Primary Examiner* — Donald L Mills
(74) *Attorney, Agent, or Firm* — Patent Portfolio Builders PLLC

(57) ABSTRACT

In order to address problems arising due to conflicting transmissions of different services, each transport block transmitted to a receiver includes at least two code blocks and the decision by the receiver to flush and replace parts of the soft buffer and/or to add the soft bits to only some of the code blocks of a transport block is based on a combination of the multi-bit feedback transmitted by the receiver and a multi-bit indication in the DCI (Downlink Control Information) transmitted by the transmitter.

32 Claims, 6 Drawing Sheets

(51) Int. Cl.
    *H04L 5/00*    (2006.01)
    *H04W 72/04*   (2009.01)
(52) U.S. Cl.
    CPC .......... *H04L 1/1835* (2013.01); *H04L 1/1864* (2013.01); *H04L 1/1896* (2013.01); *H04L 5/0007* (2013.01); *H04W 72/042* (2013.01)

(56)                References Cited

U.S. PATENT DOCUMENTS

2018/0145797 A1*  5/2018  Yeo ..................... H04L 1/1896
2019/0379487 A1* 12/2019  Hwang ................ H04L 1/0061
2019/0379489 A1* 12/2019  Hwang ................ H04L 1/1614
2020/0028632 A1*  1/2020  Iyer ..................... H04L 1/1614
2020/0195386 A1*  6/2020  Marinier ............... H04L 1/1845

OTHER PUBLICATIONS

International Search Report and Written Opinion, dated Mar. 19, 2018, from corresponding/related International Application No. PCT/SE2017/051356.

* cited by examiner

ENHANCEMENTS FOR RETRANSMISSION DUE TO CONFLICTING TRANSMISSIONS FOR DIFFERENT SERVICES

BACKGROUND OF THE INVENTION

Wireless communications occur in an environment with unpredictable interference and channel variations. HARQ (Hybrid Automatic Repeat Request) is a common technique used to address the unpredictable interference and channel variations. HARQ involves a wireless device receiving a downlink transmission to attempt to decode a data message in the transmission.

FIG. 1 is a signaling diagram of a conventional HARQ technique employed between transmitter 105 and receiver 110 in an LTE system. Initially, the transmitter 105 transmits up to two transport blocks in a TTI (Transmission Time Interval) to receiver 110 (step 115). An example of this transmission is illustrated in FIG. 2 in which $TTI_1$ includes two transport blocks and $TTI_2$ includes two transport blocks. Receiver 110 then determines whether each of the two transport blocks was successfully received (step 120). Because LTE provides for up to two transport blocks per TTI, the receiver 110 transmits a HARQ-ACK consisting of 2 bits, each bit indicating success of failure of a respective transport block (step 125).

The transmitter then determines, based on the value of the bits in the HARQ-ACK, whether one or more transport blocks were not successfully decoded (step 130). If so, the transmitter 105 transmits the unsuccessfully decoded transport block(s) to the receiver 110 (step 135). The receiver 110 then attempts to decode the unsuccessfully decoded transport block by soft combining it with the retransmitted transport block (step 140). The type of soft combining can vary, and can involve the well-known Chase or Incremental Redundancy soft combining techniques. Soft combining greatly increases the probability of successful decoding.

LTE, which is a standard in 3GPP family of wireless systems, is highly optimized for MBB (Mobile BroadBand) traffic. The TTI (subframe) has 1 ms duration and, for FDD (Frequency Division Duplex) the HARQ-ACK is transmitted in subframe n+4 for a data transmission in subframe n.

URLLC (Ultra-Reliable Low Latency Communication) is data service with extremely strict error and latency requirements, including error probabilities as low as $10^{-5}$ or lower and end-to-end latency or lower 1 ms. Other services have similar error and latency requirements, such as the so-called short TTI in LTE.

Although the fifth generation of mobile telecommunications and wireless technology is not yet fully defined, it is in an advanced draft stage within 3GPP and includes work on 5G New Radio (NR) Access Technology. Accordingly, it will be appreciated that although LTE terminology is used throughout, the disclosure equally applies to equivalent 5G entities or functionalities despite the use of terminology differing from what is specified in 5G. 3GPP TR 38.802 V1.0.0 (2016-11) provides a general description of the current agreements on 5G New Radio (NR) Access Technology and final specifications may be published inter alia in the future 3GPP TS 38.2** series.

MBB and URLLC are both among a wide range of data services being targeted for 5G. To enable services with an optimized performance, the TTI lengths are expected to be different for different services, wherein a TTI may correspond to a subframe, a slot, or a mini-slot. Specifically, URLLC may have a shorter TTI length compared to MBB.

Situations may occur when an MBB transmission is transmitted when a URLLC data packet arrives at the transmitter. In order to achieve the strict latency requirements of URLLC, the MBB transmission may be blanked (i.e., interrupted) in certain time-frequency resources so that a URLLC transmission can be performed on those resources. Due to the different TTIs of MBB and URLLC, the wireless device will receive only a portion of the MBB transmission and therefore the receiving wireless device will, with high probability, fail to decode the MBB transmission. HARQ soft combining may not be an ideal solution because the soft buffer will be partly corrupt for the resource where the first transmission was blanked. The receiving wireless device may be unaware that a portion of the MBB transmission was blanked, and therefore unaware of the corrupted resource stored in the buffer, which will then require a larger number of HARQ re-transmissions is required for correct decoding than if the receiving wireless device had been aware of the resource blanked by the transmitter.

SUMMARY OF THE INVENTION

Exemplary embodiments of the present invention are directed to providing an improved HARQ to address problems arising when the transmission for one data service is blanked in favor of a transmission for another data service.

An aspect of the invention is directed to a method implemented in a transmitting node. The method involves receiving a positively or negatively valued acknowledgement for a code block in a group of code blocks transmitted to a receiving node. The method also involves, in response to the acknowledgement, providing an indication whether or not the code block in the group of code blocks is to be retransmitted, wherein if the code block is to be retransmitted the indication also indicates whether the code block in the group of code blocks carried corrupted data.

Other aspects of the invention are directed to a transmitting node for carrying out this method, as well as a computer-readable medium comprising code, which when executed by at least one processor, causes the processor to perform this method.

Another aspect of the invention is directed to a method implemented in a receiving node. This method involves transmitting, to a transmitting node, a positively or negatively valued acknowledgement for a code block in a group of code blocks received from the transmitting node, wherein a negative valued acknowledgement is a request for retransmission of the code block in the group of code blocks. This method also involves obtaining, from the transmitting node, an indication whether the transmitting node is to retransmit the code block in the group of code blocks, wherein if the code block is to be retransmitted the indication also indicates whether the code block in the group of code blocks carried corrupted data.

Other aspects of the invention are directed to a receiving node for carrying out this method, as well as a computer-readable medium comprising code, which when executed by at least one processor, causes the processor to perform this method.

BRIEF DESCRIPTION OF THE DRAWING FIGURES

DETAILED DESCRIPTION

One solution for addressing the blanking of one data service in favor of a transmission for another data service can be to use the LTE 1-bit NDI (New Data Indicator) flag, which has a value that is changed every time new data is transmitted. In LTE, toggling the NDI flag indicates to the receiving wireless device that it should reset or flush the soft buffer, e.g., the entire soft buffer, so that it does not attempt to combine old data with new data. Thus, when an MBB transmission is partly blanked by a URLLC transmission, the transmitter can toggle the NDI flag for the retransmitted data, which will cause the receiving wireless device to flush its soft buffer and will accordingly not combine the retransmitted data with the original corrupted data. This solution, however, may not provide optimal bit efficiency because, due to the flushing of the buffer, the received non-punctured data will not be combined with re-transmitted data.

Figure 1:
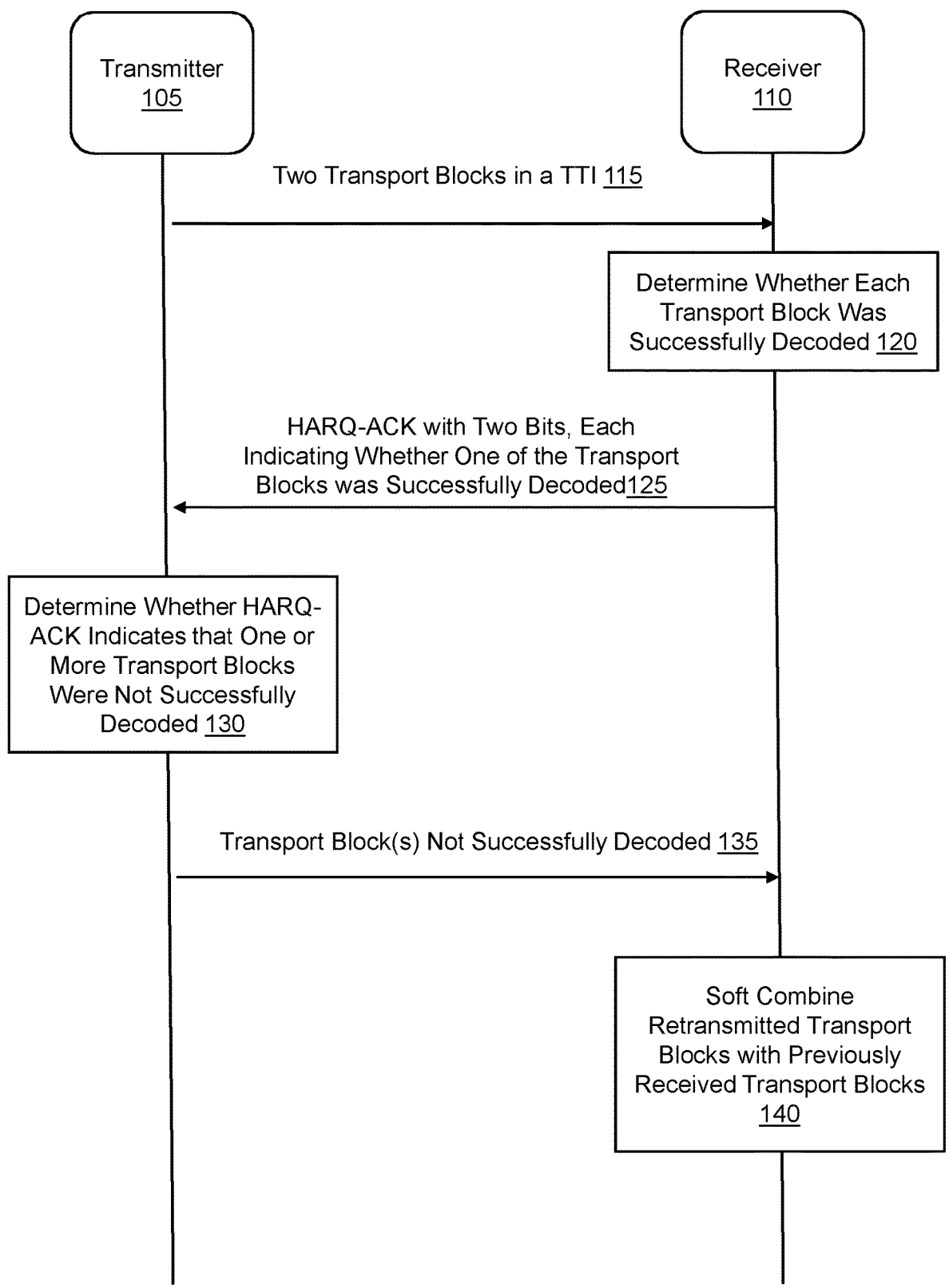
FIG. 1 is a signaling diagram of a conventional HARQ process.
Figure 2:
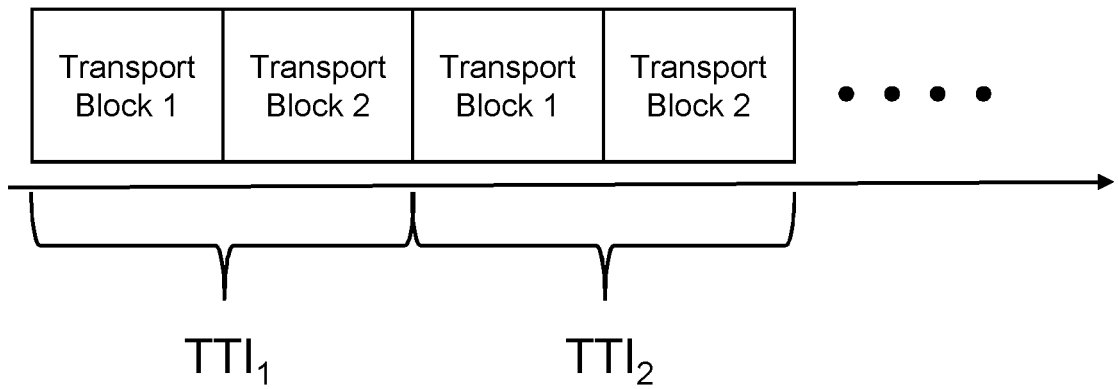
FIG. 2 is a block diagram of conventional transport block transmissions.
Figure 3A:
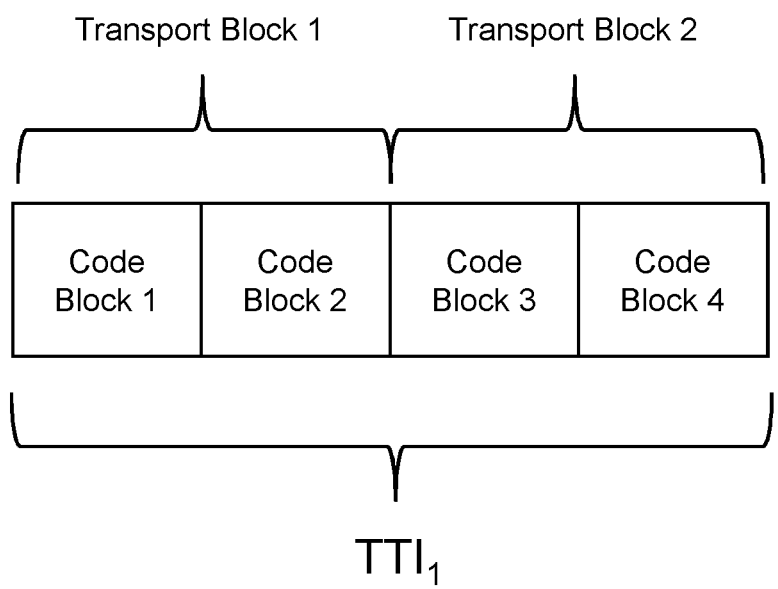
FIG. 3A is a block diagram of transport block transmissions in accordance with exemplary embodiments of the present invention.
Figure 3B:
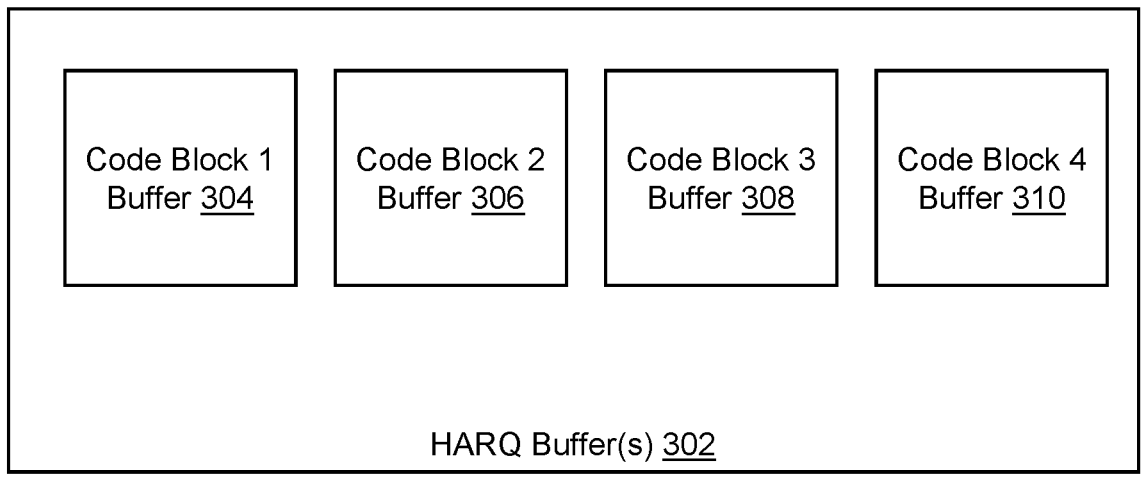
FIG. 3B is a block diagram of a HARQ buffer in a receiver in accordance with exemplary embodiments of the present invention.

The sub-optimal bit efficiency can be addressed by dividing the transport blocks into one or more code blocks, each code block being associated with a CRC (Cyclic Redundancy Check) value. An example of this is illustrated in FIG. 3A, where a $TTI_1$ includes two transport blocks (Transport Block 1 and Transport Block 2), each transport block including two code blocks (Transport Block 1 includes Code Blocks 1 and 2; and Transport Block 2 includes Code Blocks 3 and 4). The receiver can then have its soft buffer divided into as many soft-buffers as there are code blocks in a TTI. An example of this is illustrated in FIG. 3B, in which HARQ buffer 302 includes buffers 304-310, each corresponding to one of the four code blocks transmitted in a TTI. FIG. 3B illustrates a single HARQ buffer but in practice a receiver may have more than one HARQ buffer, each HARQ buffer corresponding to a separate HARQ process, e.g., LTE provides for up to eight concurrent HARQ processes and therefore eight different HARQ buffers. Further, although the code blocks have been illustrated as being divided in the time domain, the code blocks can be divided in both the time and frequency domains. Thus, if a transmission is divided into X slots in time and Y slots in frequency, the transmission would be divided into X×Y code blocks, each code block having a CRC. The receiver could have a soft buffer divided into X×Y soft buffers, one for each of the code blocks.

The use of code blocks increases bit efficiency because if a URLLC is punctured into a transmission during a TTI, it is possible that, due to the shorter TTI of URLLC, only one of the four code blocks are blanked. Therefore, only the buffer corresponding to the blanked code block needs to be flushed instead of flushing a buffer corresponding to a transport block occupying one-half of the TTI. However, the transmitter would need to indicate in the assignment of the retransmission which of the soft-buffers needs to flushed. This requires several bits to indicate which one of soft-buffers was affected by the puncturing, which may increase the control signaling overhead.

A related solution can involve using a CRC bitmap to indicate code blocks transmitted after the punctured part. For example, CRC=00000 may indicate a correct decoding (without blanking) and will be used for code block preceding a punctured code block. Assuming, for example, the second code block is punctured, then the third, fourth, and so on will be attached with a CRC=01000 bitmap. A problem with this solution is that the meaning of CRC=01000 is ambiguous to the receiver because it could mean "correct, but blanked in original transmission" or "incorrect due to normal error (i.e., not blanking)". The receiver may need to treat both 00000 and 01000 as valid correct decoding, and thus the probability the receiver considers an erroneous decoding as correct will increase. Another problem with this solution is that the receiver cannot be notified when the blanking occurs in the last code block.

According to yet another solution, which is the focus of the remaining description, each transport block includes at least two code blocks and the decision by the receiver to flush and replace parts of the soft buffer and/or to add the soft bits to only some of the code blocks of the transport block is based on a combination of the multi-bit feedback transmitted by the receiver and a multi-bit indication in the DCI (Downlink Control Information) transmitted by the transmitter. The table below illustrates the various cases for a transport block when there are two code blocks per transport block. In this table, a value of "1" is "Yes" and a value of "0" is "No".

TABLE 1

| Case | Punc- tured CBs | Decoded CBs | Acknowl- edged CBs | DCI indication | Re- transmitted CBs | Flushed CBs |
|---|---|---|---|---|---|---|
| 1 | 00 | 01 | 01 | 01 | 10 | 00 |
| 2 | 10 | 01 | 01 | 10 | 11 | 10 |
| 3 | 10 | 01 | 01 | 11 | 10 | 10 |
| 4 | 10 | 00 | 00 | 10 | 11 | 10 |
| 5 | 11 | 01 | 01 | 01 | 10 | 00 |
| 6 | 11 | 00 | 00 | 10 | 11 | 10 |
| 7 | 01 | 10 | 10 | 11 | 01 | 01 |
| 8 | 00 | 01 | 01 | 00 | 11 | 00 |
| 9 | 00 | 00 | 00 | 00 | 11 | 00 |

The combination of acknowledged code blocks and DCI indication provides an indication of a combination of retransmitted code blocks and flushed code blocks. A given code block corresponds to a given bit position in the acknowledgement and the DCI. The combination of transmitted acknowledgement and received DCI may be interpreted as follows in terms of retransmission and flush.

TABLE 2

| Acknowledgement for the CB (1 = ACK, 0 = NACK) | DCI indication for the CB | CB is retransmitted | UE should flush the CB (because the CB first transmitted was punctured) |
|---|---|---|---|
| 1 | 1 | No | No |
| 1 | 0 | Yes (despite positive ACK) | No |
| 0 | 1 | Yes | Yes |
| 0 | 0 | Yes | No |

With respect to the case when there is an ACK for the code block and a DCI indication of 0 (i.e., the second row in the table above), the receiver can discard the retransmitted code block because it was correctly decoded. It should be recognized that the transmitter may perform a retransmission in this case even though the receiver transmitted an ACK due to the transmitter not correctly receiving the ACK (and therefore interpreting the transmitted ACK as a NACK) or the transmitter not having had sufficient time to process the ACK transmitted from the receiver (e.g., when the receiver sent the ACK in the symbol preceding the retransmission).

Thus, according to this solution only failed parts of the message (i.e., code blocks for which decoding fails or code blocks carrying corrupted data, such as punctured data) need to be retransmitted, which either saves resources or results in more reliable transmissions. A receiver receiving a transmission carrying corrupted (e.g., punctured) data can be instructed to flush the soft buffer for only part of the transmission. Because the indication whether a particular code block carries corrupted (e.g., punctured) data is not sent with the first transmission but only with the retransmission of the code block, total signaling overhead can be limited.

Table 2 summarizes the receiver's actions and assumptions based on the DCI and code block decoding. It should be recognized, however, that the transmitter can make certain assumptions that can be used to signal the receiver to act in a desired manner. For example, if the transmitter received an ACK for a punctured code block, the transmitter may assume that the received ACK was erroneous due to an error at the receiver (e.g., the receiver incorrectly determined that the punctured code block was properly decoded) or a NACK was transmitted but was received as an ACK. In this case, instead of providing a DCI indication of 0 and transmitting the code block again, which indicates to the receiver not to flush the buffer, or providing a DCI indication of 1 and not transmitting the code block again, the transmitter can send a DCI indication of 1 and transmit the code block again. This will result in the receiver flushing the punctured code block from the buffer and attempting to decode the retransmitted code block.

Figure 3C:
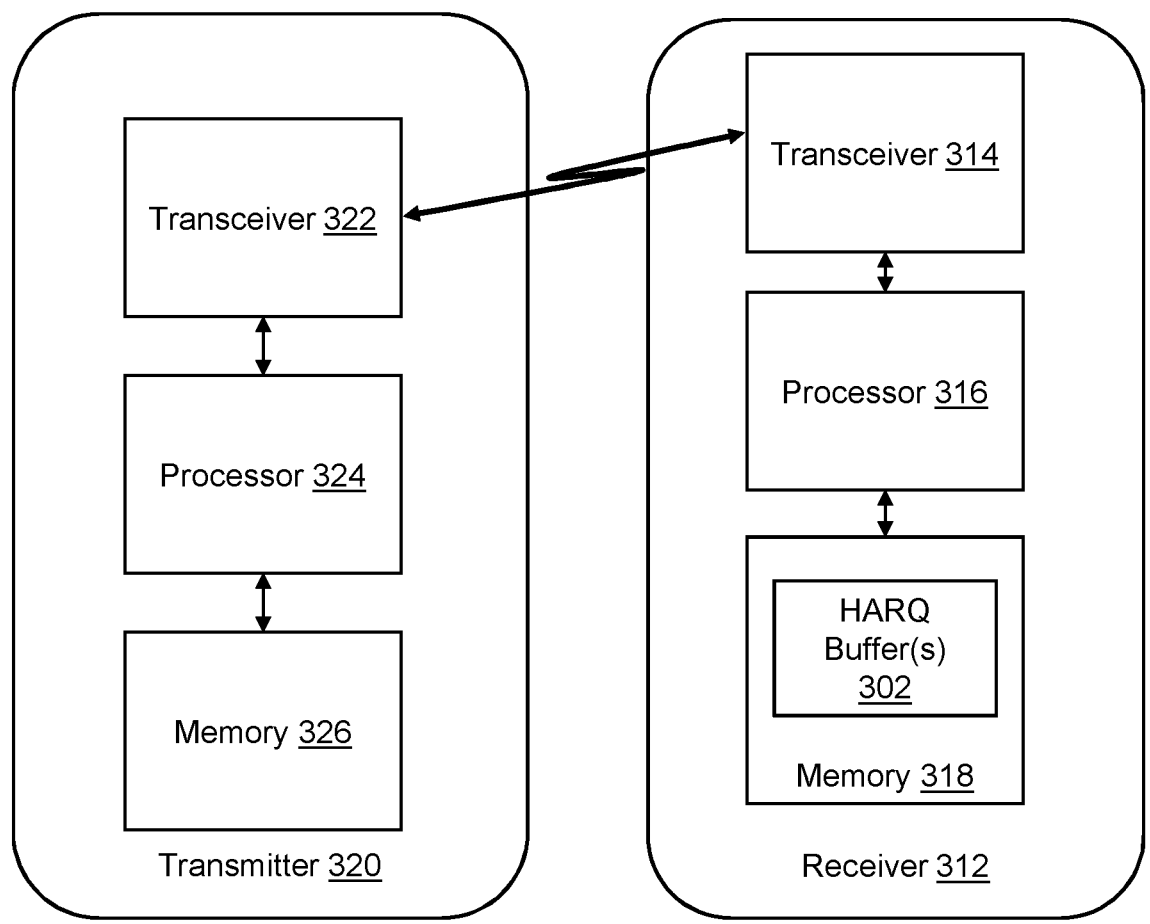
FIG. 3C is a block diagram of a transmitter and receiver in accordance with exemplary embodiments of the present invention.

A high-level description of an exemplary transmitter and receiver will be presented in connection with FIG. 3C to assist the reader in understanding the details of the implementation of the HARQ process of the present invention that follows. As illustrated, a transmitter 320 can transmit information to receiver 312, and receiver 312 can transmit information to transmitter 320. In order to accomplish this transmitter 320 includes a processor 324 coupled to a transceiver 322 and memory 326; and receiver 312 includes a processor 316 coupled to a transceiver 314 and memory 318. Processors 316 and 324 can be any type of processor or processing circuitry, such as a microprocessor, application specific integrated circuit (ASIC), field programmable gate array (FPGA), and/or the like. Memory 318 and 326 can be any type of memory and can include both transitory and non-transitory memory. The non-transitory memory can include code, which when executed by the associated processor, causes the processor to perform the methods described herein. The non-transitory memory can include a computer-readable medium storing the code. Although FIG. 3C illustrates the use of transceivers, separate transmitters and receivers can be provided, depending upon implementation. FIG. 3C is a high-level illustration of a transmitter 320 and receiver 312 and those skilled in the art will recognize that each can include additional components, such as input devices, interfaces to other devices, one or more antennas, one or more displays, etc. The transmitter 320 and receiver 312 can also be referred to as a transmitting node and receiving node, respectively.

The discussion below assumes only one transmitted layer; however the number of feedback bits and DCI indication bits would increase if a higher number of transmitted layers is employed. Although the discussion below assumes the transmitter 320 is a base station (e.g., an eNB, a gNB, or any other type of base station) and the receiver 312 is a UE (user equipment), the invention can also be employed where the transmitter 320 is a UE and the receiver 312 is a base station, in which case the DCI indication may be transmitted as uplink DCI (UL-DCI). The term UE is intended to cover both devices having dedicated user, e.g., a smartphone, as well as devices that do not, e.g., sensors, actuators, etc. The present invention is also applicable in a sidelink scenario in which both the transmitter 320 and receiver 312 are UEs.

The signaling between the transmitter 320 and receiver 312 will now be described in connection with FIG. 4. Initially, transmitter 320 transmits two transport blocks, each divided into at least two code blocks, in a TTI to receiver 312 (step 405). Again, an example of this is illustrated in FIG. 3A, which was discussed above. The code block division is performed in the time domain of the transmitted symbols such that a code block starts in an OFDM symbol and ends in an OFDM symbol. For example, first code block can cover the first four OFDM symbols, and a second code block can cover the subsequent 3 OFDM symbols, with a sequence in time as TB=[CB1, CB2]. The division of a transport block into code blocks is predefined for a given transport block and is known to both the transmitter 320 and receiver 312.

The receiver 312 attempts to decode each code block of the two transport blocks and determines whether each code block was successfully decoded (step 410). The receiver 312 then transmits a HARQ-ACK with feedback indicating, for each code block, whether or not the code block was successfully decoded (step 415). The receiver 312 reports HARQ feedback for each received code block using an ACK/NACK bit, for a total of n bits. Alternatively, a set of code blocks is mapped to an ACK/NACK bit, where an AND operation is performed on the reported code blocks. In one example, the receiver 312 reports two ACK/NACK bits, one for code block 1 and one for code block 2. If the receiver 312 fails decoding of a code block, or if the transmitter 320 has introduced corrupted data into the code block (e.g., it has punctured or blanked parts of or the whole code block), the receiver 312 will report NACK.

Transmitter 320 determines the HARQ-ACK indicates that one or more code blocks were not successfully decoded and whether any of the transmitted code blocks were blanked (i.e., punctured for a transmission for a different service) (step 420). For example, when a transmission to the receiver 312 has been punctured in some of the n code blocks, the receiver 312 reports NACKs for these, and transmitters 320 retransmits them along with an indication that the receiver 312 should flush the soft buffer corresponding to the punctured code blocks. This corresponds to case 2 in Table 1.

Alternatively, the transmitter 320 also indicates that the successfully decoded code block is not retransmitted, which corresponds to case 3 in Table 1. Whether to retransmit parts or the whole transport block can be a choice made by the scheduler of the transmitter 320.

Although the examples above involve a single puncturing of a transport block, the present invention also addresses situations when a transport block is punctured multiple times. For example, CB1 and CB2 can be punctured at the same transmission, which corresponds to cases 5 and 6 of Table 1. Additionally, when a retransmission is punctured the same type of puncturing indication can be used for the subsequent retransmission.

Figure 4:
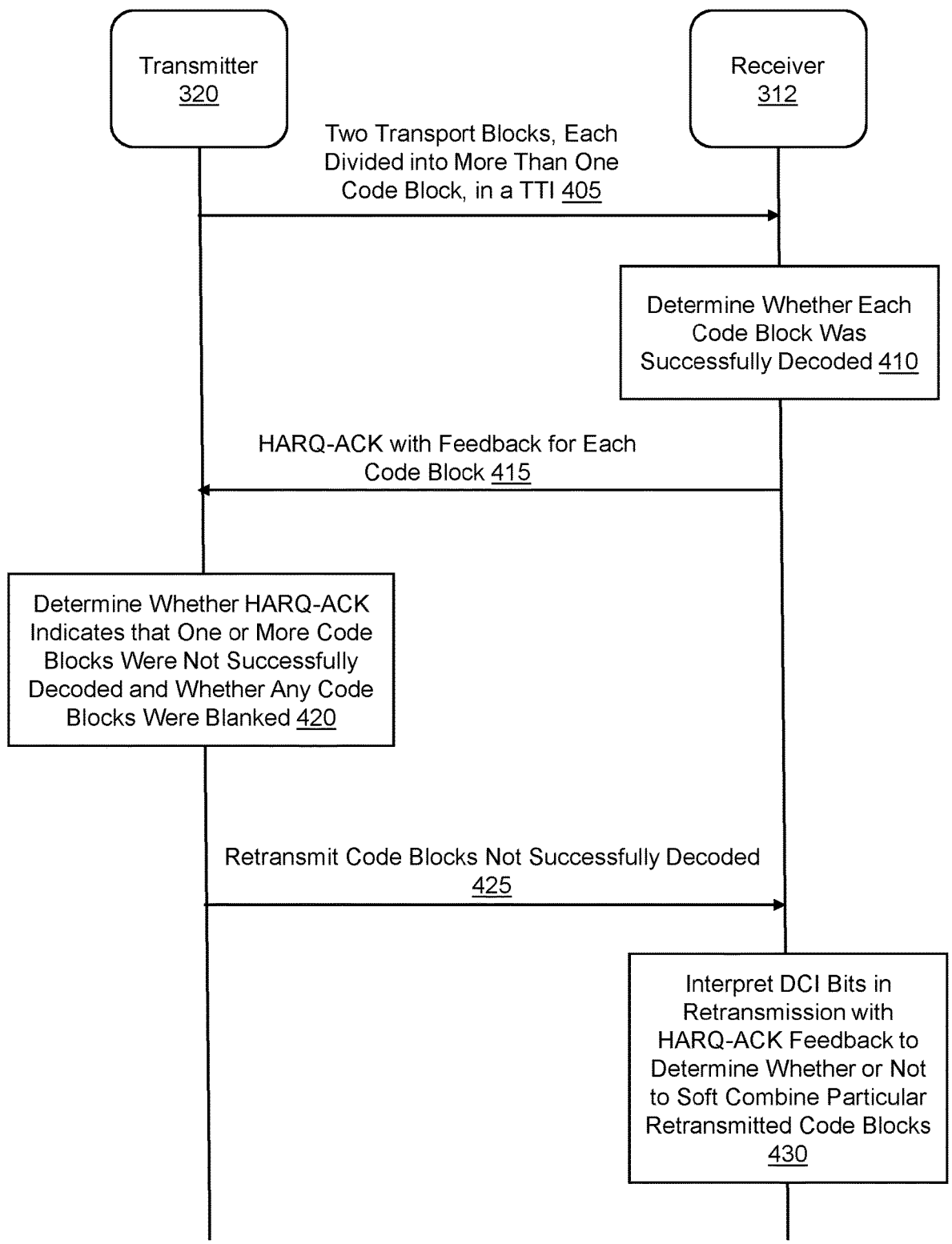
FIG. 4 is a signaling diagram of a HARQ process in accordance with exemplary embodiments of the present invention.

Although FIG. 4 illustrates the determination of whether any of the code blocks were blanked as occurring after receiving the HARQ-ACK, this can be performed prior to receiving the HARQ-ACK, such as at the time of transmission of the code blocks.

The transmitter 320 then retransmits at least the code blocks that were not successfully decoded, along with DCI bits indicating which of the code block buffers should be flushed prior to decoding (step 425). The transmitter 320 indicates the code blocks being retransmitted using n bits in the DCI indication for the retransmission. For example, 10 indicates the first code block is not retransmitted, which corresponds to case 1 of Table 1. The DCI indication is a scheduler decision, and the transmitter 320 can choose to retransmit the full transport block anyway, as in case 8 in Table 1. When receiving ACK for a code block, the transmitter 320 can use DCI indication to signal that a code block is not retransmitted.

The transmitter 320 uses the same TBS (Transport Block Size) for the re-transmission even if not all code blocks are transmitted, which effectively results in a lower code rate. For example, the retransmitted code blocks may be repeated on the symbols of the skipped code blocks. For LTE, tables 7.1.7.1-1 and 7.1.7.2.1-1 of 3GPP TS 36.213 provide transport block size as a function of MCS and the number of resource blocks assigned to the receiver 312.

As an alternative to using the same transport block size, when the transmitter 320 retransmits only parts of a transport block the transmitter can indicate a different MCS for which the receiver 312 can calculate a new transport block size. The transmitter 320 and receiver 312 will then map the remaining code blocks onto the entire transport block size. Optionally, if a new MCS is not indicated for the retransmission and only part of the original transport block is indicated, the receiver 312 interprets the transmission as being shorter in time and receives only the number of OFDM symbols corresponding to the remaining code blocks. Alternatively, the transmitter 320 may indicate in a bit of the DCI whether the transport block size of the first transmission is to be maintained in the retransmission or the transport block size is to be recalculated in accordance with the number of retransmitted code blocks. The recalculation may follow a predetermined rule.

The receiver 312 then interprets the received DCI bits in combination with the HARQ-ACK feedback transmitted to the transmitter 320 to determine whether to perform soft combining using the retransmitted code block and a previously received and buffered code block or whether to flush the buffer for one of the code blocks and perform regular decoding (step 430). For example, for a particular code block a transmitted ACK in combination with a DCI indication of 1 for the code block is interpreted as skipping (e.g., omitting) the code block in the retransmitted transport blocks, which corresponds to case 1 in Table 1. Another example involves a retransmission with a puncturing indication (or more generally, an indication of corrupted data), in which a transmitted NACK for a code block together with a DCI indication of 1 for the code block is interpreted as a punctured code block for which the soft buffer should be flushed and replaced with the retransmission.

In order to perform the soft combining the receiver 312 directs data of a retransmitted code block to a corresponding soft buffer 304-310, or alternatively, to a corresponding portion of the soft buffer if the soft buffer is used for several code blocks. When the receiver 312 receives a retransmission consisting of a subset of the code blocks in the first transmitted transport block, the receiver 312 maps the soft values of the coded symbols corresponding to the retransmitted code blocks to the soft values of the first transmission. For example, a procedure similar to Incremental Redundancy addition of soft bits can be employed. As another example, the retransmitted code block is repeated on the transmitted symbols of the skipped code block, e.g., such that [CB1 CB2] in a first transmission is followed by [CB2 CB2] in a retransmission. In yet another example the circular buffer of the remaining code block (e.g. CB2) is mapped out over the whole transport block size.

In another example, the symbol-to-resource mapping is modified, so that a symbol is mapped to two resources when only one out of two code blocks is re-transmitted. In another example, if CB2 is re-transmitted (but not CB1) as [CB2 CB2], the receiver 312 can assume the transmission was actually [CB2(RV) CB2(RV+1)], where RV is the values signaled in the DCI of the re-transmission.

Figure 5:
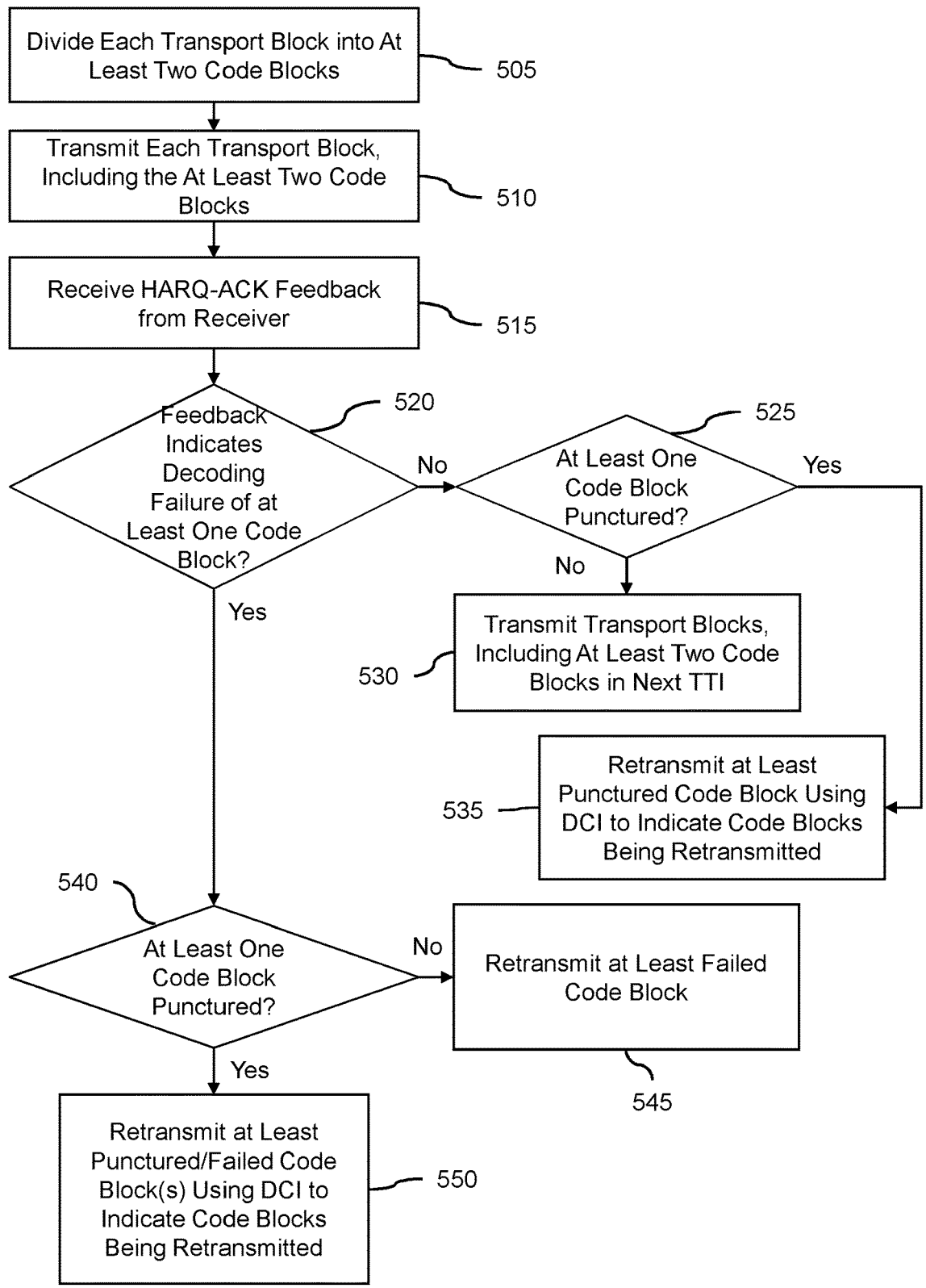
FIG. 5 is a flow diagram of an exemplary HARQ process performed by a transmitter in accordance with exemplary embodiments of the present invention.

FIG. 5 is a flow diagram of an exemplary HARQ process performed by the transmitter 320 in accordance with exemplary embodiments of the present invention. Initially, the transmitter 320 divides each transport block into at least two code blocks (step 505) and transmits the two transport blocks, each including at least two code blocks, to the receiver 312 during a TTI (step 510).

As discussed above, there is typically a delay between the transmission of transport blocks in a TTI and the reception of the feedback from the receiver. Accordingly, transmitter 320 will likely perform other actions between this transmission and the receptions of the HARQ-ACK feedback from the receiver 312 (step 515).

Transmitter 320 then determines whether the HARQ-ACK feedback indicates a failure to decode at least one code block (step 520). If the HARQ-ACK indicates all code blocks for the TTI were successfully decoded ("No" path out of step 520), transmitter 320 determines whether it punctured at least one of the code blocks in favor of a transmission for another service during the TTI (step 525). If there were no punctured code blocks ("No" path out of decision step 525), then there is no need to retransmit the code blocks for that TTI and another set of transport blocks, each including at least two code blocks, is transmitted in the next TTI (step 530).

If at least one of the code blocks were punctured ("Yes" path out of decision step 525), the transmitter retransmits at least the punctured code block using bits in the DCI to indicate whether or not to flush the receiver buffer corresponding to the retransmitted code block (step 535).

When the HARQ-ACK indicates the decoding failure of at least one code block for the TTI ("Yes" path out of decision step 520), the transmitter 320 then determines whether at least one code block transmitted during the TTI was punctured (step 540). If there were no punctured code blocks during the TTI ("No" path out of decision step 540), then the transmitter 320 retransmits at least the failed code block (step 545). Depending upon implementation, a scheduler of the transmitter 320 can decide to use the bit in the DCI to indicate the code blocks being retransmitted and those that are not.

If at least one of the code blocks were punctured during the TTI ("Yes" path out of decision step 540), then the transmitter 320 retransmits at least the punctured/failed code block(s) using bits in the DCI to indicate the code blocks being re-transmitted. Step 550 can be reached when the unsuccessfully decoded code block is the same as the punctured one or it can be different, which is why this step refers to retransmitting the punctured/failed code block(s).

The decision of whether at least one code block was punctured in steps 525 and 540 is based upon a previous determination of punctured code blocks, which as discussed above can occur during or shortly after the TTI of transmission.

Figure 6:
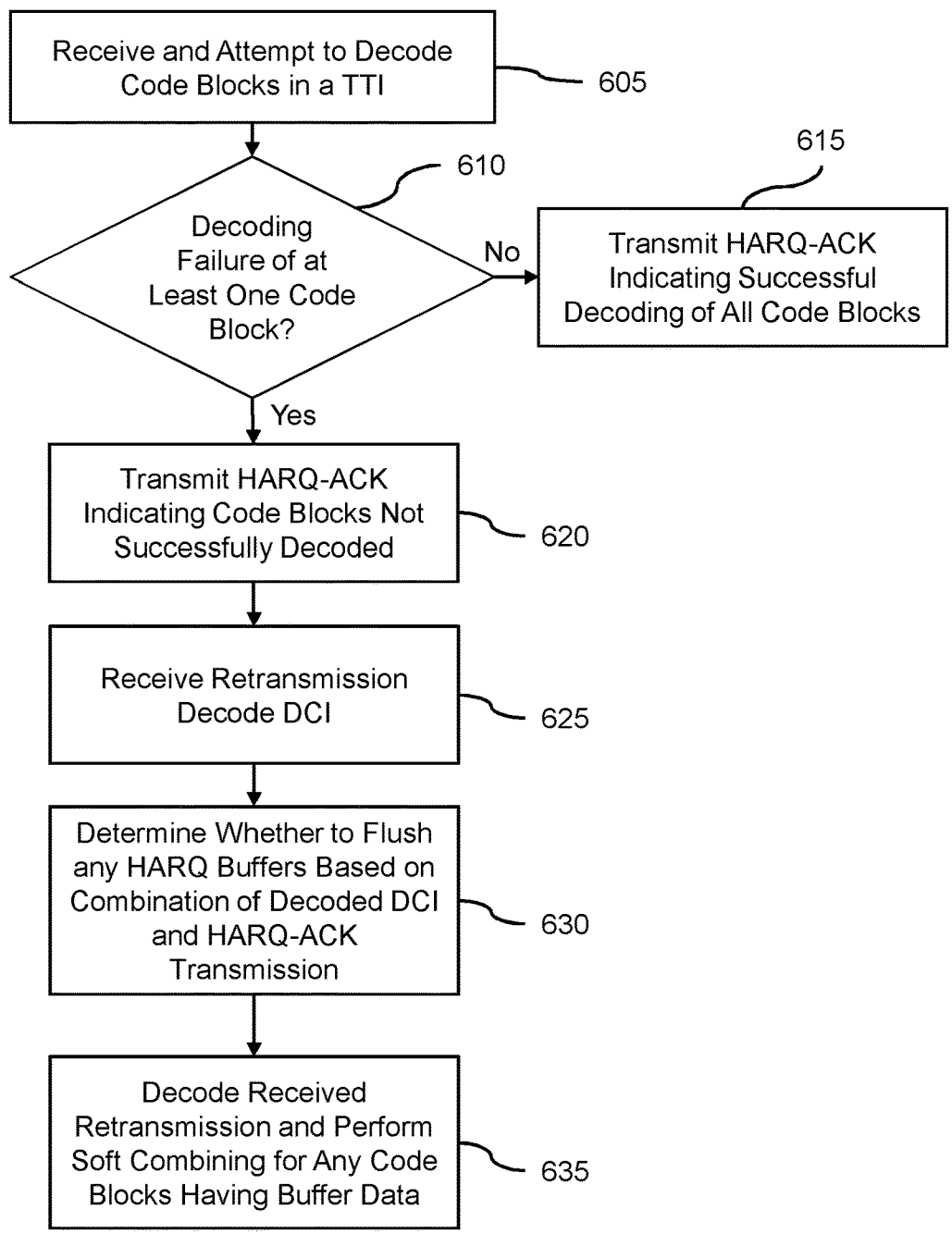
FIG. 6 is a flow diagram of an exemplary HARQ process performed by a receiver in accordance with exemplary embodiments of the present invention.

FIG. 6 is a flow diagram of an exemplary HARQ process performed by the receiver 312 in accordance with exemplary embodiments of the present invention. Initially, the receiver 312 receives and attempts to decode the received code blocks (step 605) and then determines whether any of the code blocks were not successfully decoded (step 610). When all code blocks were successfully decoded ("No" path out of decision step 610), then receiver 312 transmits a HARQ-ACK indicating successful decoding of all code blocks (step 615).

If, however, the receiver 312 determines that at least one code block was not successfully decoded ("Yes" path out of decision step 610), the receiver 312 transmits a HARQ-ACK indicating the code blocks that were not successfully decoded (step 620). After a period of time—there will be a delay between the transmission of the HARQ-ACK and the retransmission during which the receiver 312 can perform other functions—the receiver 312 receives the retransmission of at least the unsuccessfully decoded blocks and decoded the DCI (step 625). The receiver 312 then determines whether to flush any of the HARQ buffers associated with the different code blocks based on a combination of the decoded DCI and the HARQ-ACK transmission (step 630). After any buffer has been flushed, the receiver 312 then decodes the received retransmission and performs soft combining for any of the code blocks having buffer data and regular decoding for any of the code blocks that do not have buffer data (step 635).

The description above assumes the receiver 312 is reporting on whether an MBB transmission having at least two code blocks per transport block is successfully decoded. The present invention can also be employed for reporting on a URLLC transmission in which each transport block consists of only one code block. In this case, the receiver 312 can report multiple levels of HARQ or duplicate the reported bits. Specifically, when the receiver is operating on a short TTI length (e.g., mini-slot), consisting of, for example, 2 OFDM symbols, the transmission may not be divided into CBs. The receiver 312 can then use the available n reporting bits to indicate levels of ACK/NACK while providing an indication of a suitable Modulation and Coding Scheme (MCS), e.g.: 00=NACK, MCS can increase; 01=ACK, MCS at the limit; 10=NACK, MCS 1 step too high; 11=NACK, use lowest MCS. The available MCSs are indexed in a predefined order. Alternatively, the receiver 312 duplicates the ACK/NACK bit on the available n resource bits. The transmitter 320 and receiver 312 know for which transport block size the transport blocks can be divided into code blocks and transmits/receives the feedback accordingly.

Although exemplary embodiments described above involved puncturing on the code block level, the present invention can also be employed for puncturing on a symbol level so that symbol indices of symbols that have been punctured are indicated to the receiver 312. The receiver 312 can then translate each symbol index into a CB that has been punctured. Typically, the receiver 312 can, while performing code block segmentation in the first decoding, make a list of the symbol(s) associated with each code block. Then, after receiving indication of punctured symbols, the receiver 312 can use that list to determine which code block to flush.

In another embodiment, the receiver 312 does not flush the whole soft buffer corresponding to a code block but instead runs the interleaver using the specified punctured locations as an input to obtain the individual soft values in the soft buffer to flush. If even more bits were used in the puncturing indication, it would be possible to transmit also some level of punctured frequency locations, which further limits the amount of flushed soft values.

The indication of corrupted data (in particular, the puncturing indication) may have a different granularity in different embodiments. One approach is to indicate which symbols have been punctured. Another embodiment targeting larger eMBB allocations, where the transport block comprises two or more code blocks, includes providing one puncturing indication for each code block. The indication may include a multi-bit HARQ, with one bit per code block, as explained in detail above. Although the amount of overhead associated with the puncturing indication may decrease if the puncturing indication is made more granular, e.g., is given on the code block level, the receiver 312 may still be able to determining independently what portion of the code block was subject to puncturing. The receiver 312 may carry out this determination in a standalone fashion, without relying on signaling from the transmitter 320.

As discussed above, although exemplary embodiments have been described with the transmitter 320 being a network node, such as a base station, and the receiver 312 being user equipment, the present invention can similarly be applied when the roles are reversed. In this case, if a base station transmission of a transport block consisting of n code blocks is punctured in one or more of the code blocks, base station can indicate which code blocks should be retransmitted in the UL grant for the retransmission. The same mechanism is used if one of the code blocks failed in the decoding without being punctured. For this case the same method as for DL, for mapping of the reduced transport block onto the transmission resource, is used. The optional behavior of indicating same or new MCS to make the user equipment transmit with lower code rate or for shorter time, also applies for UL data.

Thus, the embodiments disclosed in this section provide radio communication systems, devices and methods for enabling enhanced retransmissions. It should be understood that this description is not intended to limit the invention. On the contrary, the exemplary embodiments are intended to cover alternatives, modifications and equivalents, which are included in the spirit and scope of the invention. Further, in the detailed description of the exemplary embodiments, numerous specific details are set forth in order to provide a comprehensive understanding of the invention. However, one skilled in the art would understand that various embodiments might be practiced without such specific details.

Although the features and elements of the present exemplary embodiments are described in the embodiments in particular combinations, each feature or element can be used alone without the other features and elements of the embodiments or in various combinations with or without other features and elements disclosed herein. The methods or flowcharts provided in the present application may be implemented in a computer program, software or firmware tangibly embodied in a computer-readable storage medium for execution by a computer or a processor.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The invention claimed is:

1. A method implemented in a transmitting node, the method comprising:
  receiving a respective positively or negatively valued acknowledgement for each code block in a group of code blocks transmitted to a receiving node in first pair of transport blocks, each transport block divided into at least two code blocks, wherein the receiver reports a negatively valued acknowledgement for each code block in which transmission to the receiver has been punctured; and
  in response to the negatively valued acknowledgement, retransmitting each punctured code block and providing to the receiving node a respective indication whether or not each code block in the group of code blocks is to be retransmitted, wherein for each code block that is to be retransmitted the indication also indicates whether or not the receiver should flush a soft buffer corresponding to each code block.

2. The method of claim 1, wherein the indication comprises a respective flag for each code block, the flag having a value that depends at least in part on a value of the acknowledgement for the code block.

3. The method of claim 2, further comprising assigning the value of the flag such that different combinations of the acknowledgement and the assigned value of the flag indicate:
  (i) the code block is not to be retransmitted;
  (ii) the code block is to be retransmitted and the soft buffer is to be flushed prior to decoding; and
  (iii) the code block is to be retransmitted and the soft buffer is not to be flushed prior to decoding.

4. The method of claim 1, wherein the indication is composed of a respective sub-indication for each code block in the group of two or more code blocks.

5. The method of claim 4, further comprising:
  retransmitting less than all code blocks of the group of two or more code blocks in a second pair of transport blocks having a transport block size corresponding to a transport block size of the first pair of transport blocks.

6. The method of claim 4, further comprising:
  retransmitting less than all code blocks of the group of two or more code blocks in a second pair of transport blocks having a transport block size different from the transport block size of the first pair of transport blocks, wherein the transport block size of the second pair of transport blocks is signaled to the receiving node.

7. The method of claim 6, wherein the transport block size of the second pair of transport blocks is signaled with reference to a Modulation and Coding Scheme, MCS.

8. The method of claim 4, further comprising:
  retransmitting less than all code blocks of the group of two or more code blocks in a second pair of transport blocks having a transport block size different from the transport block size of the first pair of transport blocks, wherein the transport block size of the second pair of transport blocks is determined according to a predetermined rule based on a number of code blocks of the group of two or more code blocks that are to be retransmitted.

9. The method of claim 1, further comprising:
  transmitting the first pair of transport blocks including a code block carrying punctured data, wherein the indication indicates that the code block carrying punctured data is to be retransmitted and that the buffer associated with the code block is to be flushed.

10. The method of claim 2, wherein the transmitting node is a base station, the acknowledgement relates to Automatic Repeat Request, ARQ, or Hybrid ARQ, and the flag relates to Downlink Control Information, DCI.

11. The method of claim 2, wherein the transmitting node is a user equipment, a negative value of the acknowledgement relates to an uplink grant for retransmitting the code block, and the flag relates to uplink Downlink Control Information, DCI.

12. The method of claim 1, wherein the acknowledgement is received as part of a combined feedback field that also indicates a Modulation and Coding Scheme, MCS, or a MCS modification.

13. The method of claim 1, further comprising:
  transmitting, to the receiver, an indication for at least one OFDM symbol of a code block carrying corrupted data whether the OFDM symbol carried corrupted data.

14. The method of claim 1, further comprising:
  transmitting, to the receiver, for at least one frequency location of a code block carrying corrupted data, an indication whether the frequency location carried corrupted data.

15. The method of claim 1, wherein the transmitted group of two or more code blocks are part of a mobile broadband service and a code block carries corrupted data due to transmission of a code block for a low-latency communication service.

16. A transmitting node comprising a wireless interface and processing circuitry configured for:
  receiving a respective positively or negatively valued acknowledgement for each code block in a group of two or more code blocks transmitted to a receiving node in a first pair of transport blocks, each transport block divided into at least two code blocks, wherein the receiver reports a negatively valued acknowledgement for each code block in which transmission to the receiver has been punctured; and
  in response to a negatively valued acknowledgement, retransmitting each punctured code block and providing to the receiving node a respective indication whether or not each code block in the group of code blocks is to be retransmitted, wherein for each code block that is to be retransmitted the indication also indicates whether or not the receiver should flush a soft buffer corresponding to each code block.

17. A method implemented in a receiving node, comprising:
- transmitting, to a transmitting node, a respective positively or negatively valued acknowledgement for each code block in a group of two or more code blocks received from the transmitting node in a first pair of transport blocks each transport block being divided into at least two code blocks, wherein a negative valued acknowledgement indicates that transmission of the respective code block is punctured and is a request for retransmission of the code block in the group of code blocks;
- receiving, from the transmitting node, retransmitted code blocks and a respective indication whether or not the transmitting node is to retransmit each code block in the group of two or more code blocks, wherein for each code block that is to be retransmitted the indication also indicates whether or not the receiver should flush a soft buffer corresponding to each code block.

18. The method of claim 17, further comprising:
- receiving and processing the retransmitted code blocks in accordance with the indication and the positively or negatively valued acknowledgement for the code block.

19. The method of claim 17, further comprising:
- buffering the code block received in the first pair of transport blocks in a buffer of the receiving node; and
- determining, based on the indication and the positively or negatively valued acknowledgement for the code block, whether or not to combine the buffered code block and the retransmitted code block.

20. The method of claim 19, further comprising:
- flushing the buffer or allowing content of the buffer to be overwritten when the indication indicates that the code block buffer should be flushed.

21. The method of claim 17, wherein the indication is received at least in part by receiving a flag, the method further comprising:
- for a value of the flag and a positive acknowledgement preserving the buffer; and for the value of the flag and a negative acknowledgement flushing the buffer.

22. The method of claim 17, wherein the indication is received at least in part by receiving a flag having a value assigned such that different combinations of the acknowledgement and the flag indicate:
  (i) the code block is not to be retransmitted;
  (ii) the code block is to be retransmitted and the buffer is to be flushed; and
  (iii) the code block is to be retransmitted and the buffer is not be flushed.

23. The method of claim 17, wherein the indication is composed of sub-indications corresponding to respective code blocks in the group of code blocks.

24. The method of claim 23, further comprising:
- receiving a second pair of transport blocks including less than all code blocks of the group of code blocks, the second pair of transport blocks having a transport block size different from a transport block size of the first pair of transport blocks; and receiving signaling indicating the transport block size of the second pair of transport blocks.

25. The method of claim 24, wherein the transport block size of the second pair of transport blocks is signaled with reference to a Modulation and Coding Scheme, MCS.

26. The method of claim 23, further comprising
- receiving a second pair of transport blocks having less than all code blocks of the group of two or more code blocks, the second pair of transport blocks having a transport block size different from a transport block size of the group of code blocks; and
- determining according to a predetermined rule the transport block size of the second pair of transport blocks based on a number of the code blocks to be retransmitted.

27. The method of claim 21, wherein the receiver is a user equipment, a negative value of the acknowledgement relates to an uplink grant for retransmitting the code blocks, and the flag relates to Downlink Control Information, DCI.

28. The method of claim 21, wherein the receiver is a base station, the acknowledgement relates to Automatic Repeat Request, ARQ, or Hybrid ARQ, and the flag relates to Downlink Control Information, DCI.

29. The method of claim 17, wherein the acknowledgment is transmitted as part of a combined feedback field that also indicates a Modulation and Coding Scheme, MCS, or a MCS modification.

30. The method of claim 17, further comprising:
- obtaining an indication for a least one OFDM symbol of a code block carrying corrupted data whether the OFDM symbol carried corrupted data.

31. The method of claim 17, further comprising:
- obtaining, for at least one frequency location of a code block carrying corrupted data, an indication whether the frequency location carried corrupted data.

32. A receiving node comprising a wireless interface and processing circuitry configured for:
- transmitting, to a transmitting node, a positively or negatively valued acknowledgement for each code block in a group of code blocks received from the transmitting node in a first pair of transport blocks, each transport block being divided into at least two code blocks, wherein a negative valued acknowledgement indicates that transmission to the receiving node in the respective code block is punctured, and is a request for retransmission of the punctured code block;
- receiving, from the transmitting node, retransmitted code blocks and a respective indication whether or not the transmitting node is to retransmit each code block in the group of code blocks, wherein for each code block that is to be retransmitted the indication also indicates whether or not the receiving node should flush a soft buffer corresponding to each code block.

* * * * *